Figures 1, 2, 3:
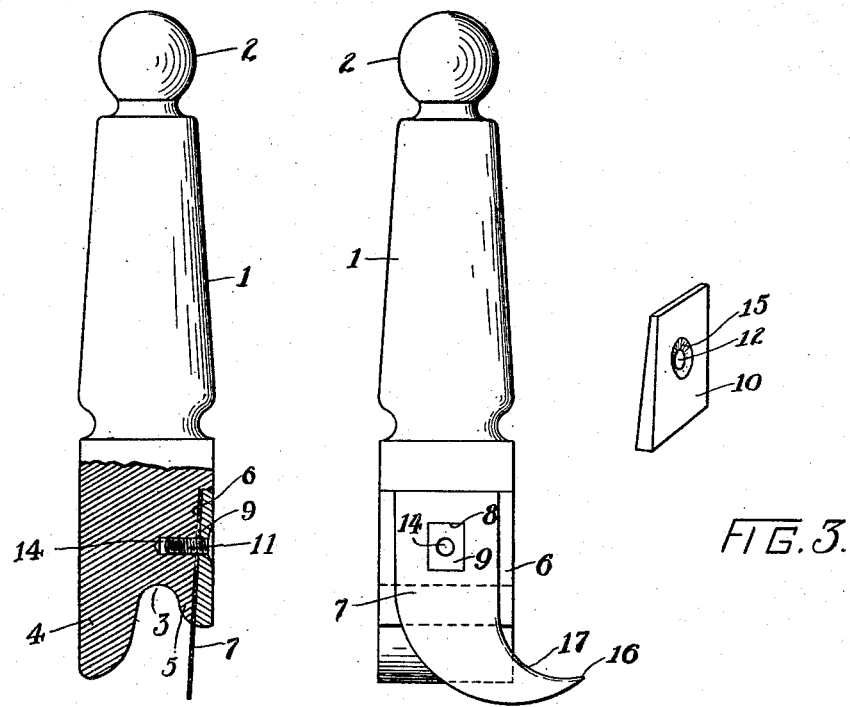

N. W. HOWARD.
CUTTER.
APPLICATION FILED DEC. 27, 1915.

1,192,200.

Patented July 25, 1916.

Inventor
Norman W. Howard.

By ⎯⎯⎯⎯⎯
Attorney

UNITED STATES PATENT OFFICE.

NORMAN W. HOWARD, OF BATH, MAINE.

CUTTER.

1,192,200.  Specification of Letters Patent.  Patented July 25, 1916.

Application filed December 27, 1915. Serial No. 68,599.

*To all whom it may concern:*

Be it known that I, NORMAN W. HOWARD, a citizen of the United States, residing at Bath, in the county of Sagadahoc, State of Maine, have invented certain new and useful Improvements in Cutters, of which the following is a specification.

This invention relates to cutters, and particularly to a tool for cutting the bead from the shoe or casing of a pneumatic tire.

My cutter is especially designed for use in the re-covering of used tires. In this branch of the tire industry, the shoe of a used tire is used as a cover for the worn tread of another tire. The bead is first cut from the shoe and then sewed or otherwise secured to the tire to be re-treaded. Heretofore the beads have been cut from the shoe by means of an ordinary knife. This method of cutting has been attended by several difficulties, chief among which has been the problem of guiding the knife in the groove between the bead and shoe while making the cut. The ordinary knife has no gage whereby it may be guided. Moreover, the thickness of the shoe at the bead, and the difficulty of cutting through the several tough layers of lapped canvas and rubber has made it practically impossible for even the most careful operator to secure a clean, even cut. This matter of securing a uniformly accurate cut is one of great importance, for if the cut is not even, the fact that the tire has been re-covered is noticeable.

To the end therefore of providing a tool for severing the bead from the shoe of a tire with a uniformly even, accurate cut and which shall be of inexpensive construction and capable of ready manipulation even by those not especially skilled in this art, I have devised my present invention.

My cutter consists of a handle member having a guiding portion formed to bear against and be guided by the edge of the bead whereby to dispose the cutting element in the grove formed at the juncture of the bead with the shoe, and to positively guide said cutter as the handle is moved around the periphery of the shoe.

The construction and manner of using my cutter is fully disclosed in the specification which follows. In the drawings accompanying that specification I have shown as illustrative of the principles of my invention a cutter which I have found satisfactory in actual use and well adapted to the requirements of manufacture.

Figure 4:
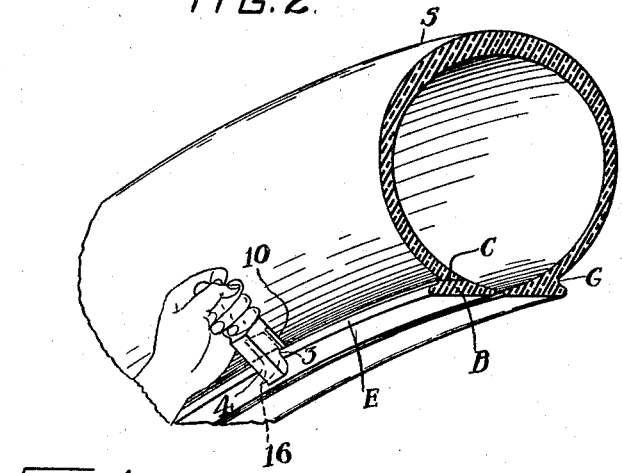

Throughout this specification and in the drawings like reference numerals are correspondingly applied, and in these drawings: Figure 1 is an edge view partially in section of a cutting tool in accordance with my invention. Fig. 2 is a face view thereof with the blade clamping member removed. Fig. 3 is a detail view of said member, and Fig. 4 is a perspective view of a portion of a tire and illustrating the manner of using my cutter.

I have indicated at 1 a suitably shaped handle having a rounded or otherwise formed head 2. The member 1 at its opposite end is transversely recessed or channeled as indicated at 3 providing a pair of guiding members 4 and 5 of different lengths. The opposed faces of the members 4 and 5 are rounded off as best shown in Fig. 1 so that the recess 3 corresponds to the shape of the lateral edge E of the clencher bead B of a tire shoe S.

The outer face of the member 5 is recessed as indicated at 6 to provide a seat for a cutter 7. The recess 6 is deeper at its lower than at its upper end so as to dispose the cutter 7 angularly with relation to the axis of the tool. The cutter 7 has a squared opening 8 therein adapted to fit over a correspondingly shaped lug or boss 9 formed on the exposed outer face of the portion 5, whereby to secure the blade 7 against movement. The blade is clamped in position by means of a clamping member 10 of substantially the same size as the cut-out 6 and of a shape to press the blade 7 flatly to its seat. The member 10 and blade 7 are held in the assembled relation shown in Fig. 1 by a screw or other fastening 11 passing through the holes 12 and 8 in the members 10 and 7 respectively and received in a lateral bore 14 in the handle 1.

The outer face of the member 10 is countersunk as indicated at 15 whereby to dispose the head of the screw flush with the wall of the handle. The cutter 7 may be of any desired shape and is preferably of the shape best illustrated in Fig. 2 in which the exposed portion of the blade beyond the edge of the portion 5 is curved and tapered to a point 16. That edge of the blade disposed on the shorter radius is sharpened as indicated at 17.

In use, the channeled portion 3 of the tool is applied to the lateral edge E of the bead B. This disposes the guiding portion 4 against the under face of the bead and the portion 5 below the upper face of said bead with the blade 7 in the groove G at the juncture of the shoe S with the bead. The point 16 of the blade is then forced through the shoe and the tool drawn along the bead, causing the sharpened edge 17 to sever the bead from the shoe.

The cut produced is indicated at C in Fig. 4. In the cutting action of the tool, the blade is positively guided in the groove G by the bearing of the portions 4 and 5 against the edges of the bead. This produces a uniform even cut. The angular disposition of the blade produces a cut having a slight bevel. The shoe S may therefore be sewed to the casing of the tire to be covered in a manner to produce a neat and not really noticeable juncture.

Various modifications in the form and construction of my invention may obviously be resorted to if within the limits of the appended claims.

What I therefore claim and desire to secure by Letters Patent is:

1. A tool of the class described, comprising a member having a curved recess at one end providing spaced portions of different lengths having rounded bearing surfaces, one of said portions adapted to engage the lateral edge of a tire bead and the other portion being adapted to be disposed in the groove between said bead and the adjacent portion of the shoe, and a cutter carried by said last named portion and adapted to be inserted through the tire at the juncture of the bead with the shoe.

2. A tire tool comprising a handle member adapted to be applied to the lateral edge of a tire bead, and having spaced guiding portions adapted to be disposed on opposite sides of the bead when the tool is in use, and a cutter guided by one of said portions and insertible between the bead and the adjacent portion of the shoe.

3. A tool of the class described, comprising a member having spaced guiding portions adapted to bear upon the lateral edge of a tire bead, and a cutter carried by one of said portions in angular relation thereto and adapted to be inserted between the bead and the adjacent portion of the shoe.

4. A tool of the class described, comprising a member having a recess across one end providing spaced guiding portions adapted to be applied to the lateral edge of a tire bead on opposite sides thereof, and a cutter effectively disposed relative to said guiding portion and having a curved cutting edge adapted to be inserted between the bead and the adjacent portion of the shoe.

5. A tire tool, comprising a handle member having a recess across one end adapted to be applied to the lateral edge of a tire bead and having guiding portions spaced by said recess and adapted to bear on opposite sides of the bead when the tool is in use, and a cutter carried by one of said portions and insertible between the bead and the adjacent portion of the shoe, said cutter consisting of a relatively straight blade having an end curved and tapered to a point, the edge of said blade on the shorter radius of said curved portion being sharpened to said point.

In testimony whereof I affix my signature in presence of two witnesses.

NORMAN W. HOWARD.

Witnesses:
PAULINE M. MIKELSKY,
EDWARD W. BRIDGHAM.

Copies of this patent may be obtained for five cents each, by addressing the "Commissioner of Patents, Washington, D. C."